COMMUNICATION SYSTEM

Filed Aug. 11, 1960

3 Sheets-Sheet 1

INVENTOR.
ALAN B. SIMPKINS
BY
Christie, Parker & Hale
ATTORNEYS

Dec. 17, 1963 A. B. SIMPKINS 3,114,800

COMMUNICATION SYSTEM

Filed Aug. 11, 1960 3 Sheets-Sheet 2

INVENTOR.
ALAN B. SIMPKINS
BY
Christie, Parker & Hale
ATTORNEYS

Dec. 17, 1963 A. B. SIMPKINS 3,114,800

COMMUNICATION SYSTEM

Filed Aug. 11, 1960 3 Sheets-Sheet 3

INVENTOR.
ALAN B. SIMPKINS

BY Christie, Parker & Hale

ATTORNEYS

United States Patent Office 3,114,800
Patented Dec. 17, 1963

3,114,800

COMMUNICATION SYSTEM

Alan B. Simpkins, Los Altos, Calif., assignor to Delcon Corporation, Palo Alto, Calif., a corporation of California Filed Aug. 11, 1960, Ser. No. 48,915
5 Claims. (Cl. 179—1.5)

This invention relates to encoding and decoding speech.

In many situations in both industry and government it is often desirable to transmit speech in a coded form so that it will be intelligible only to the person for whom the message is intended. For example, in a business in which telephone calls pass through a switchboard, a person speaking on a telephone line connected through the switchboard often would like to be sure that his conversation is not overheard or understood by unauthorized persons.

This invention provides apparatus for converting speech into an encoded or unintelligible sound for transmission over a conventional communication system, so any unauthorized person who might have access to the encoded speech during its transmission will not be able to understand the conversation. The invention also includes apparatus for decoding the encoded sound so that an authorized person receives the sound as spoken.

One of the simplest ways of encoding the human voice is by frequency inversion. In this method, a device known as a speech inverter virtually turns a person's voice upsidedown, much as the lens of a camera inverts the image of an object in the field of vision. Conversation becomes as unintelligible as a strange foreign language, with seemingly no apparent relation to the original speech. Yet this same incoherent jargon may be restored to normal by a similar process of inversion.

In creating inverted speech, normal voice frequencies are caused to modulate, in a standard manner, a constant audio frequency (inverting frequency) to produce frequencies which are combinations of the speech frequencies and the inverting frequency. These resulting frequencies include an upper and lower side-band which are, respectively, the inverting frequency plus the voice frequencies, and the inverting frequency minus the voice frequencies. By selecting the inverting frequency to be just above the highest essential voice frequency, the lower side-band is an inverted picture of the original input voice frequencies, so that the low frequencies become highs, and the high frequencies become lows. For example, using an inverting frequency of 3000 cycles per second, an input frequency of 200 cycles becomes 3000 minus 200, or 2800 cycles in the difference frequency band (lower side-band). A 2500-cycle input becomes 500 cycles, and all other frequencies will correspondingly be inverted. The upper side-band is representative of the original input frequencies raised up in the spectrum by the value of the inverting frequency. This upper side-band is attenuated by filters, and only the inverse (lower side-band) frequency is used for transmission.

The apparatus of this invention is ideally suited to be mounted on a conventional telephone handset, so that speech before going into the telephone is first encoded by the apparatus, and speech coming from the telephone receiver is passed through the apparatus and decoded before reaching the ear of a listener.

The speech-encoding system of this invention includes a case having a sound-receiving opening and a sound-emitting opening constructed to fit over the mouthpiece of a telephone. A miniaturized speech-encoding circuit is mounted in the case and has an input and an output. A microphone is mounted in the case to receive sound, say normal speech, from the sound-receiving opening in the case and transmit corresponding electrical signals to the encoding circuit input. A receiver is mounted in the case to receive encoded electrical signals from the encoding circuit output and direct encoded sound to the sound-emitting opening in the case.

The speech-decoding system of the invention includes a case having a sound-receiving opening constructed to fit over the earpiece of a telephone, and having a sound-emitting opening. A speech-decording circuit is mounted in the case and has an input and an output. A microphone is mounted in the case to receive encoded sound from the sound-receiving opening in the case and transmit corresponding electrical signals to the decoding circuit input. A receiver is mounted in the case to receive decoded electrical signals from the decording circuit output and direct decoded sound to the sound-emitting opening in the case.

Preferably both the encoding and decoding systems have acoustical insulation disposed in the case between their respective sound-receiving and sound-emitting openings to avoid the inadvertent by-passing of sound around the encoding and decoding circuits.

In the preferred form of the invention, the encoding and decoding systems are included in one integral portable unit adapted to be releaseably mounted over the earpiece and mouthpiece of a conventional telephone handset. Miniature components and transistor circuitry are used to provide a practical, dependable circuit of low battery drain. All necessary components, including batteries are packaged in a tough, durable plastic housing which is light-weight, small, compact and completely portable. In this form, the invention contemplates an attachment for a generally elongated telephone handset provided with a microphone and a mouthpiece, and a receiver and an earpiece at opposite ends. The attachment includes a generally elongated case having a mouthpiece end and an earpiece end shaped to fit against the mouthpiece and earpiece, respectively, of the telephone handset. The case has a sound-receiving opening on one side of the earpiece end to receive encoded sound from the handset earpiece, and a sound-emitting opening on the other side of the earpiece end of the handset to direct decoded sound away from the case and into the ear of a listener. A sound-receiving opening is at the mouthpiece end of the case to receive normal speech, and a sound-emitting opening is on the opposite side of the mouthpiece end of the case to direct encoded sound into the handset microphone.

Preferably, the case includes a handle to fit against an intermediate part of a telephone handset to facilitate manual clamping of the case to the handset while the speech encoding and decoding apparatus is used.

These and other aspects of the invention will be more fully understood from the following detailed description taken in conjunction with the accompanying drawings in which.

Figure 1:
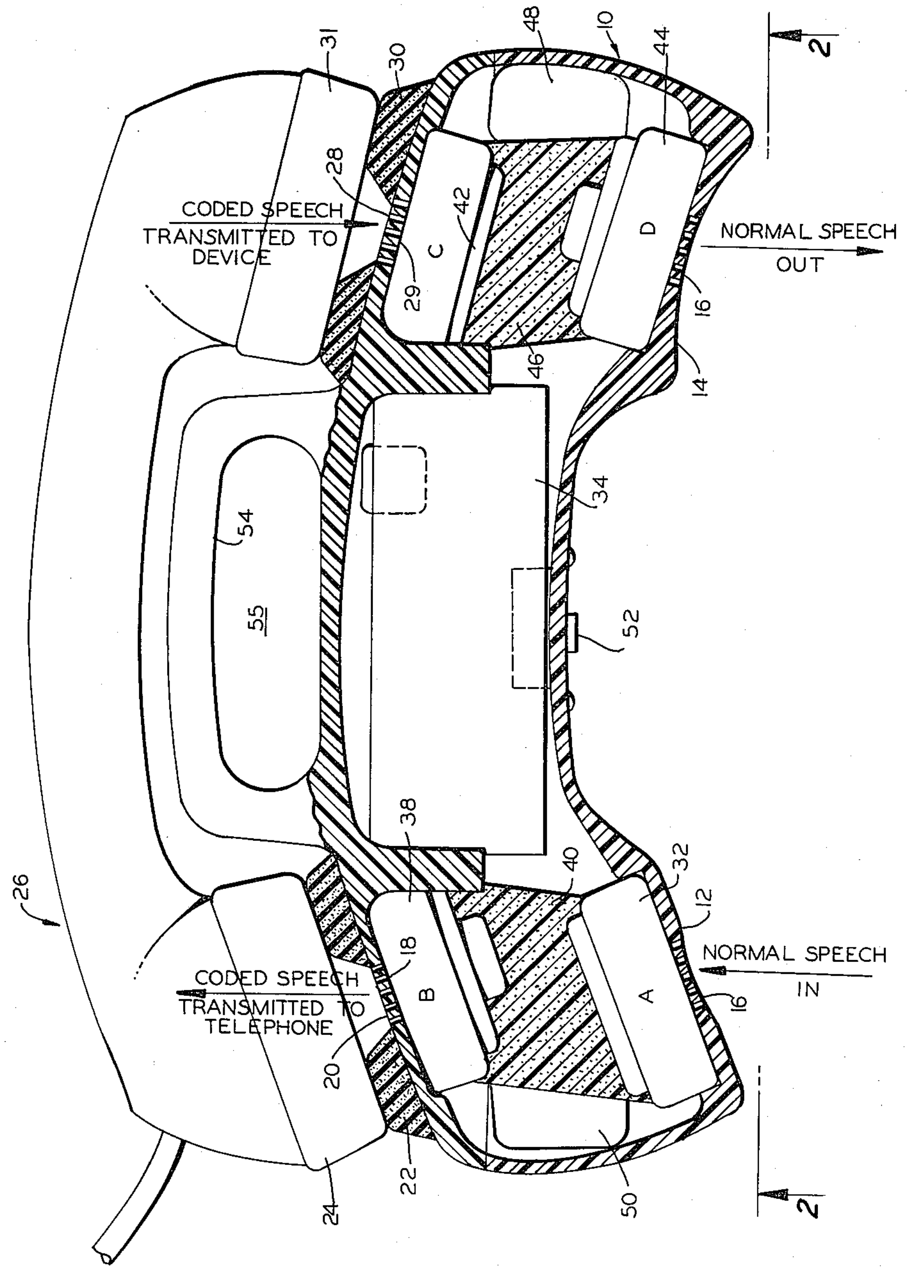
Fig. 1 is a view taken on line 1—1 of FIG. 2 showing a sectional elevation of the presently preferred embodiment of this invention mounted on a conventional telephone handset.
Figure 2:
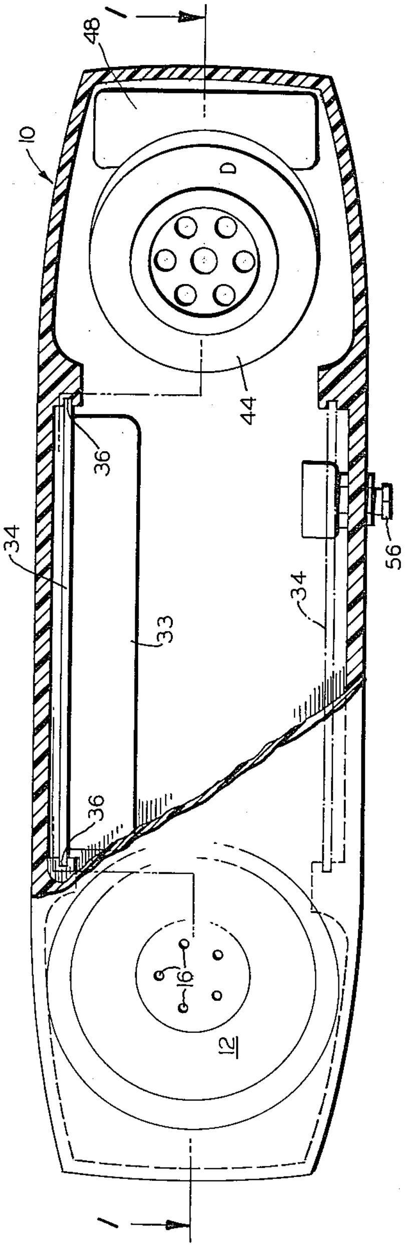
FIG. 2 is an elevation, partly broken away taken on line 2—2 of FIG. 1.

Referring to FIGS. 1 and 2, the communication device of this invention includes an elongated hollow case 10 having a normal speech mouthpiece 12 at one end and a normal speech earpiece 14 at its other end. The mouthpiece and earpiece each include a plurality of openings 16 which permit normal speech to enter and leave the case. The case is of the same general shape as a typical telephone handset, and preferably is made of a durable, light-weight plastic.

A coded speech outlet 18 is on the mouthpiece end of the case and on the opposite side, and includes a plurality of perforations 20 to permit coded speech to leave the case 10. An adapter 22, which preferably is a resilient annular spongerubber cushion, is mounted around the coded speech outlet to make a soundproof fit against the mouthpiece 24 of a conventional telephone handset 26. The adapter can also be made of rigid material and accurately shaped to mate with the mouthpiece of the handset, but resilient material is preferred because it more readily accommodates different styles of telephones.

A coded speech inlet 28 is formed at the earpiece end of the case and on the side opposite from the normal speech earpiece 14. The coded speech inlet has a plurality of perforations 29. An adapter 30, which also preferably is a resilient spongerubber cushion, is mounted around the coded speech inlet to make a soundproof fit against the earpiece 31 of the telephone handset.

Figure 3:
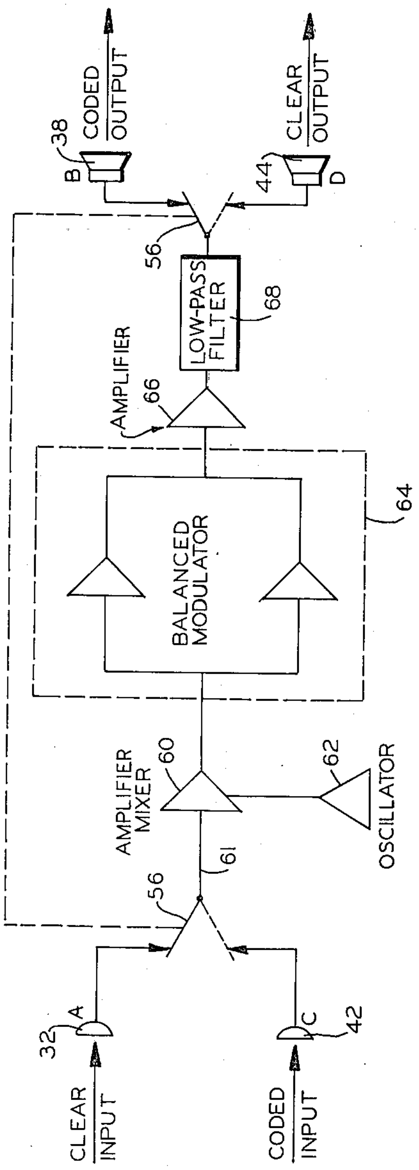
FIG. 3 is a block diagram of a circuit used in the apparatus of this invention for both coding and decoding.
Figure 4:
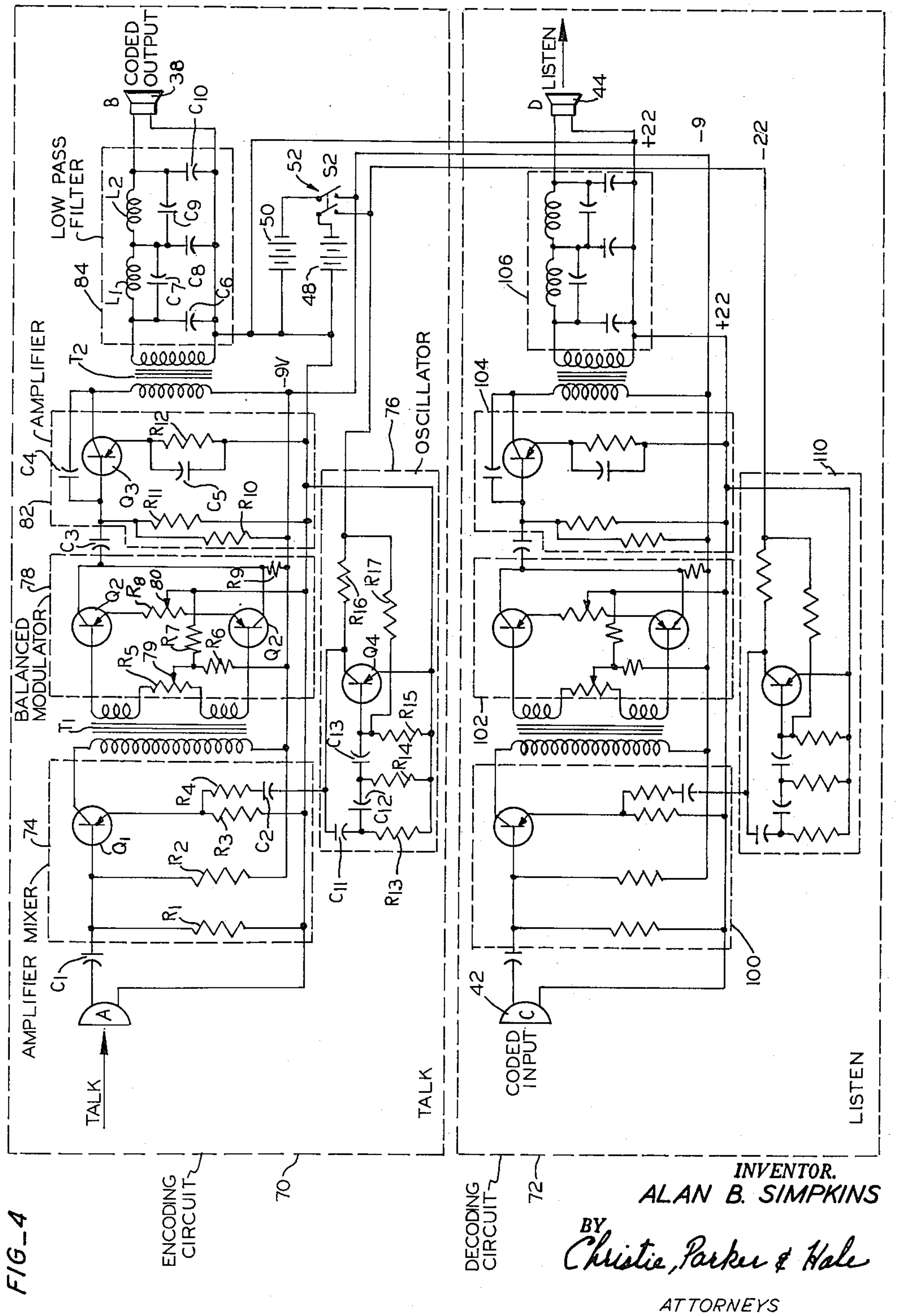
FIG. 4 is a schematic circuit diagram of separate encoding and decoding circuits used for duplex operation of this invention.

A first microphone 32, which may be of the conventional telephone type, is mounted in the normal speech mouthpiece end of the case to receive normal speech and convert it to corresponding electrical signals, which are fed into the input of an encoding circuit 33, such as those shown in FIGS. 3 or 4, mounted on a rectangular printed circuit board 34 within the case. As shown best in FIGS. 1 and 2, the printed circuit board is mounted within the case so that its opposite ends fit in internal grooves 36 formed adjacent one side of the case interior.

A first receiver 38, which may be of the conventional telephone type, is mounted in the case to convert electrical signals from the encoding circuit to encoded sound and direct the encoded sound out of the coded speech outlet 18 and into the telephone mouthpiece. The first microphone 32 and the first receiver 38 are acoustically insulated from each other by a mass of foam rubber 40, or other suitable material mounted inside the case.

A second microphone 42 is mounted in the case adjacent the coded speech inlet 28 to convert coded speech into corresponding electrical signals, which are fed into the decoding circuit as shown in FIGS. 3 or 4. A second receiver 44, which also may be of the conventional telephone type, is mounted in the case adjacent the case earpiece to receive decoded electrical signals and direct normal, decoded speech out of the earpiece 14. The second receiver receives its electrical signals as shown in the circuits of FIGS. 3 or 4. The second microphone and second receiver are acoustically insulated from each other by a mass of foam rubber 46, or other suitable acoustical insulating material mounted in the case.

A first battery 48 is mounted at the earpiece end of the case between the second microphone and second receiver. A second battery 50 is mounted in the mouthpiece end of the case between the first receiver and first microphone. An off-on switch 52 is mounted on the right (as viewed in FIG. 1) side of the case, and connected as shown in FIG. 4.

As shown best in FIG. 1, a handle 54 is formed integrally with the left side of the case, and is shaped to fit against the intermediate portion of the telephone handset between the earpiece and the mouthpiece. The handle has an opening 55 through it so the case can be held in place by the same hand that holds the telephone handset.

As shown best in FIG. 2, a push-to-talk switch 56 is mounted on the exterior of the right side of the case, and is connected as shown in FIG. 3, when the same circuit is to be used for both encoding and decoding. As explained in more detail below, when the apparatus is to be used for duplex operation, i.e., simultaneous encoding and decoding, the push-to-talk switch is replaced by a second printed circuit board 34 mounted as shown in phantom lines in internal grooves on the right (as viewed in FIG. 2) inside of the case interior. The circuit used for duplex operation is described in detail with respect to FIG. 4.

The circuit of FIG. 3 includes an amplifier-mixer 60 having an input 61 adapted to be connected by the push-to-talk switch 56 to the output of either the first microphone 32, of the second microphone 42. An oscillator 62 supplies a constant inverting frequency to the amplifier mixer, which amplifies the low-level speech signal from the microphone to which it is connected, and also mixes the speech signal with the inverting frequency signal supplied from the oscillator. The resulting composite signal, i.e., speech, inverting signal, difference frequency (lower side-band frequency), and sum frequency (upper side-band frequency), is fed into the input of a balanced demodulator 64, which cancels out the speech and inverting frequency signals, leaving only the sum and difference frequency signals, which are fed into an amplifier 66. The amplified sum and difference frequency signals are then fed through a low-pass filter 68 which prevents the passage of all signals above the inverting frequency so that only the difference frequency (lower side-band) is transmitted to either receiver 38 or 44 in accordance with the position of the push-to-talk switch 56.

To consider a specific example, assume that the push-to-talk switch is pushed so that the first microphone 32 is connected to the speech encoding circuit. Also assume that the oscillator supplies an inverting frequency of 3000 c.p.s. Any voice frequency directed into the microphone 32 is transmitted to the first receiver 38 as the difference between the inverting frequency and the input frequency. Thus, a voice frequency of 800 c.p.s. fed into the first microphone leaves the first receiver as 2200 c.p.s. Conversely, a voice frequency of 2200 c.p.s. spoken into the first microphone leaves the first receiver 38 at a frequency of 800 c.p.s. In effect, the speech encoding circuit turns a conversation "up-side-down" and makes it unintelligible.

When the user of the apparatus wishes to listen to encoded speech transmitted from a similar unit, he releases the push-to-talk switch so that it moves to the dotted line position shown in FIG. 3. Any coded signal picked up by the second microphone 42 is decoded, and emitted as clear talk from the second receiver 44.

FIG. 4 shows the circuitry used when the apparatus is designed for duplex operation, i.e., simultaneous encoding and decoding. As stated previously, when the apparatus is used for duplex operation, the push-to-talk switch 56 shown in FIG. 2 is removed, and a second printed circuit board and associated circuit is mounted as shown in phantom line of FIG. 2. The duplex operation device includes an encoding circuit 70 and a decoding circuit 72, which is identical with the encoding circuit. For brevity, only the encoding circuit is described in detail.

Referring to the encoding circuit portion of FIG. 4, clear talk is directed into the first microphone 32, the output of which is coupled through capacitor $C_1$ to the input of an amplifier-mixer stage 74, which includes a first transistor $Q_1$. Resistors $R_1$, $R_2$, and $R_3$ are connected as shown to the batteries 48 and 50 to provide the proper operating voltages for the transistor. The output of an oscillator 76 is coupled through a capacitor $C_2$ and a resistor $R_4$ into the emitter of the amplifier-mixer.

In the oscillator, the inverting frequency is supplied as a sine wave signal to the amplifier mixer through resistors $R_4$ and capacitor $C_2$. The oscillator is a conventional phase-shift type, with the exception of using a transistor $Q_4$ in place of the conventional vacuum tube. The oscillator can be operated in any suitable frequency range, but preferably it oscillates in the range of between about 2500–4500 c.p.s., as determined by the phase-shift network made up of resistors $R_{13}$, $R_{14}$, $R_{15}$, $R_{16}$, and capacitors $C_{11}$, $C_{12}$, and $C_{13}$, all connected as shown in FIG. 4. The value of resistor $R_{14}$ is varied to change the oscillator frequency as required to determine the coding of the unit for proper operation with companion units. The operating voltages for the oscillator are supplied by battery 48. Resistor $R_{17}$ determines the proper operation of the transistor $Q_4$.

The amplifier-mixer stage amplifies the relatively low level speech signal from the microphone and mixes it with the inverting frequency from the oscillator. The resulting composite signal i.e., speech, inverting signal, difference frequency, and sum frequency is transmitted from the output (collector) of the transistor $Q_1$ in the amplifier-mixer through a transformer $T_1$ to the input of a balanced modulator stage 78, which includes transistor $Q_2$ and $Q_2'$.

The balanced modulator stage is a transistorized version of the conventional Hartley balanced modulator which cancels out the carrier frequency and passes the upper and lower side-band frequencies. In the balanced modulator stage, resistor $R_5$ is connected as shown and supplied with a center tap 79 which serves to balance the amplitude of the input signal to the transistors $Q_2$ and $Q_2'$. Resistor $R_8$ is provided with a center tap 80 which serves to balance the amplitude of the output signals from the transistors $Q_2$ and $Q_2'$. Resistors $R_6$, $R_7$, and $R_9$ are connected as shown in FIG. 4 and chosen to provide the proper operating characteristics of the transistors $Q_2$ and $Q_2'$.

The sum and difference frequency signals are coupled from the balanced modulator output by a capacitor $C_3$ to the input of an amplifier stage 82, which includes a transistor $Q_3$. In the amplifier 82, the sum and difference frequency signals are applied to the base of transistor $Q_3$, amplified, and then applied to the low-pass filter through the transformer $T_2$. Resistors $R_{10}$, $R_{11}$, and $R_{12}$, are chosen to provide optimum operating conditions for transistor $Q_3$. Capacitor $C_4$ supplies a small amount of output signal back to the input transistor $Q_3$ to assure stable operation of the amplifier stage. Capacitor $C_5$ serves as a low resistance path for the amplified signal without altering the operating voltages for the transistor $Q_3$.

The output of the amplifier is coupled by a second transformer $T_2$ to the input of low-pass filter 84, which attenuates the sum or upper side-band frequency, and permits only the difference frequency (lower side-band) to pass to the microphone 38. The low-pass filter includes capacitors $C_6$, $C_7$, $C_8$, $C_9$, and $C_{10}$, and inductors $L_1$, and $L_2$ connected as shown in FIG. 4 and selected with values to prevent the passage of all frequencies above the inverting frequency. This characteristic allows the passage of the difference frequency while rejecting the sum frequency, which is above the inverting frequency. The coded output signal (difference frequency) is supplied to the first receiver 38, where it is converted into the coded acoustical output for transmission to the telephone microphone and through the telephone circuits as a coded electrical signal.

When receiving speech coded by a similar unit, and passed through the telephone lines, the coded electrical signal is converted back into a coded acoustical signal at the output of a telephone handset earpiece. This coded acoustical input is fed into the second microphone 42 shown in FIG. 4, and passes through an amplifier-mixer 100, a balanced modulator 102, an amplifier 104, and a low-pass filter 106, where the coded or inverted frequency is reconverted or decoded into an uncoded signal, which is fed to the second receiver 44 and emitted as clear talk. The decoding circuit of FIG. 4 also includes an oscillator 110 identical with the oscillator 76 in the encoding circuit to supply the inverting frequency to the amplifier-mixer 100. Thus, a voice signal, say of 800 c.p.s., is changed by the encoding circuit to an inverted frequency of 2200 c.p.s., if the inversion frequency is 3000 c.p.s. Conversely, the inverted 2200 c.p.s. coded signal is decoded into the original 800 c.p.s. signal by the decoding circuit.

I claim:

1. An attachment for a generally elongated telephone handset provided with a microphone and receiver at opposite ends, the attachment comprising a generally elongated case of the same general size and shape as the handset and shaped to fit against the opposite ends of the telephone handset, the case having: a first opening at one end and on one side to receive sound from the handset receiver; a second opening substantially collinear with the first opening at the said one end and on the opposite side to direct sound away from the case; a third opening at the opposite end of the case and on the said opposite side to receive clear talk; and a fourth opening substantially collinear with the third opening at the said opposite end of the case on the said one side to direct sound into the handset microphone, an encoding and decoding circuit mounted within the case, a first microphone mounted adjacent the first opening to receive coded sound, a first receiver mounted adjacent the second opening to emit decoded sound, a second microphone mounted adjacent the third opening to receive clear talk, a second receiver mounted adjacent the fourth opening to emit coded sound, means for connecting the first microphone and first receiver to the circuit so coded sound received by the first microphone is emitted from the first receiver as decoded sound, and means for connecting the second microphone and second receiver to the circuit so clear talk received by the second microphone is emitted from the second receiver as coded sound.

2. Apparatus according to claim 1 which includes acoustical insulation in the case between the first microphone and first receiver.

3. Apparatus according to claim 2 which includes acoustical insulation in the case between the second microphone and second receiver.

4. A speech encoding device comprising a case having a sound-receiving opening and a sound-emitting opening constructed to fit over the mouthpiece of a telephone, a speech encoding circuit mounted in the case and having an input and an output, a microphone mounted in the case to receive sound from the sound-receiving opening in the case and transmit corresponding electrical signals to the encoding circuit input, a receiver mounted in the case to receive encoded electrical signals from the encoding circuit output and direct encoded sound to the sound-emitting opening in the case, and acoustical insulation mounted in the case between the microphone and receiver.

5. A speech decoding device comprising a case having a sound-receiving opening constructed to fit over the earpiece of a telephone and having a sound-emitting opening, a speech decoding circuit mounted in the case and having an input and an output, a microphone mounted in the case to receive encoded sound from the sound-receiving opening in the case and transmit corresponding electrical signals to the decoding circuit input, a receiver mounted in the case to receive decoded electrical signals from the decoding circuit output and direct decoded sound to the sound-emitting opening in the case, and acoustical insulation mounted in the case between the microphone and the receiver.

References Cited in the file of this patent

UNITED STATES PATENTS

| | | |
|---|---|---|
| 2,206,590 | Webb | July 2, 1940 |
| 2,214,992 | Chevassus | Sept. 17, 1940 |